United States Patent

McBride

[15] 3,685,429
[45] Aug. 22, 1972

[54] SOY BEAN PROCESSING MACHINE
[72] Inventor: John A. McBride, Grimes, Iowa
[22] Filed: May 19, 1969
[21] Appl. No.: 825,493

[52] U.S. Cl. .................................99/235 R, 99/237 R
[51] Int. Cl. .............................................A23k 3/00
[58] Field of Search .99/235, 238, 237; 100/72, 93 S, 100/145–150; 18/12 DM, 12 M, 16

[56] References Cited

UNITED STATES PATENTS

| | | | |
|---|---|---|---|
| 1,847,690 | 3/1932 | Hottmann | 100/72 UX |
| 1,906,245 | 5/1933 | Bowling | 100/DIG. 3 UX |
| 2,144,055 | 1/1939 | Hall | 99/235 R UX |
| 2,701,518 | 2/1955 | McDonald | 100/93 S |
| 2,836,851 | 6/1958 | Holt | 100/DIG. 3 UX |
| 2,915,957 | 12/1959 | Bowman | 99/238 PD |
| 3,078,513 | 2/1963 | Levison et al. | 18/12 M |
| 3,130,666 | 4/1964 | Miller | 100/93 S |
| 3,191,229 | 6/1965 | Vanzo | 100/93 S UX |
| 2,060,408 | 11/1936 | Wood | 99/237 R |
| 2,295,868 | 9/1942 | Schwebke et al. | 99/238 PD UX |
| 3,020,162 | 2/1962 | Cunningbam et al. | 99/237R |
| 3,385,709 | 5/1968 | Wenger et al. | 99/2 |

*Primary Examiner*—Walter A. Scheel
*Assistant Examiner*—Arthur O. Henderson
*Attorney*—Zarley, McKee & Thomte

[57] ABSTRACT

A processing machine for soy beans or other like material comprising an auger assembly which force feeds soy beans into a main housing having a driven shaft rotatably extending thereinto. A screw conveyer means is rotatably mounted in the housing and is connected to the driven shaft for rotation therewith. The screw conveyer means is adapted to convey the soy beans along the entire length of the main housing from its intake end to its discharge end. The soy beans are crushed and conveyed by the conveyer means and are forced through a constricted area around the shaft of the conveyer means at the discharge end of the housing. An end plate on the housing has one end of the driven shaft rotatably extending though an opening formed therein through which the material is forced. The soy bean material is then forced between the outer surface of the end plate and a flat washer or plate on the outer end of the shaft. The soy beans are crushed, heated and cooked by heat and pressure applied thereto as the same travels through the housing and passes outwardly therefrom.

9 Claims, 8 Drawing Figures

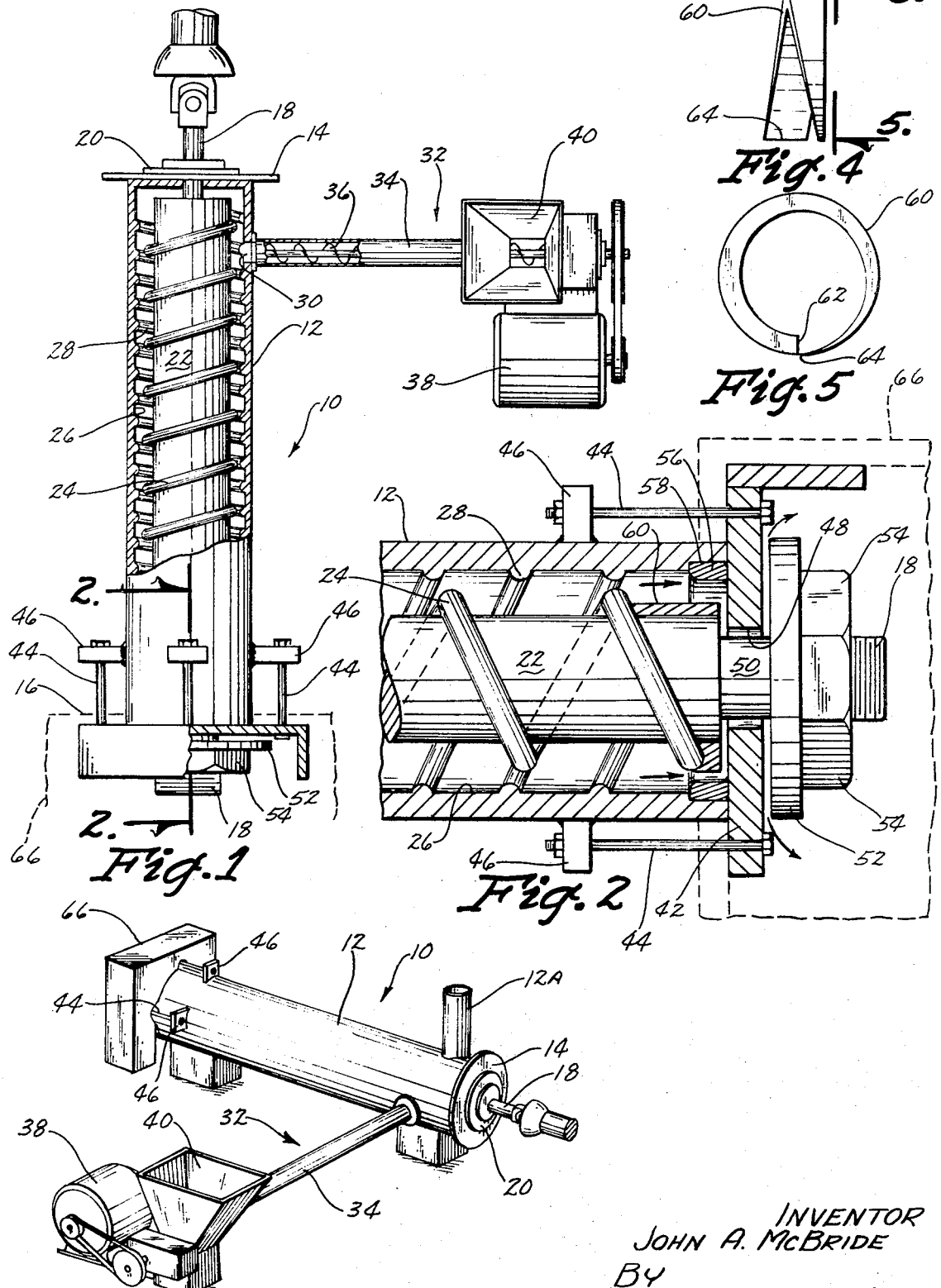

INVENTOR
JOHN A. McBRIDE
BY
Zarley, McKee & Thomte
ATTORNEYS

SOY BEAN PROCESSING MACHINE

Soy beans are not suitable for animal feed until they have been cooked to neutralize the urease activity therein. Attempts have been made to cook the soy beans prior to their use as animal feeds but the previous methods have met with little success due to the inefficiency of the methods and the relatively high cost of preparing the soy beans.

Therefore, it is a principal object of this invention to provide a processing machine for soy beans or the like.

A further object of this invention is to provide a soy bean processing machine which is efficient in operation.

A further object of this invention is to provide a soy bean processing machine which is economical of manufacture and economically processes the soy beans.

A further object of this invention is to provide a soy bean processing machine which heats and cooks the soy beans as the soy bean material is passed through a main screw conveyer housing.

A further object of this invention is to provide a soy bean processing machine which may be easily cleaned.

A further object of this invention is to provide a soy bean processing machine which will not become clogged.

A further object of this invention is to provide a soy bean processing machine which is durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a top view of the machine of this invention with portions thereof cut away to more fully illustrate the invention;

FIG. 2 is an enlarged sectional view as would be seen along lines 2—2 of FIG. 1;

FIG. 3 is a perspective view of the apparatus of this invention;

FIG. 4 is a side elevational view of a wedge element on the screw conveyer shaft;

FIG. 5 is an end elevational view of the wedge of FIG. 4 taken on line 5—5 thereof;

Figure 6:
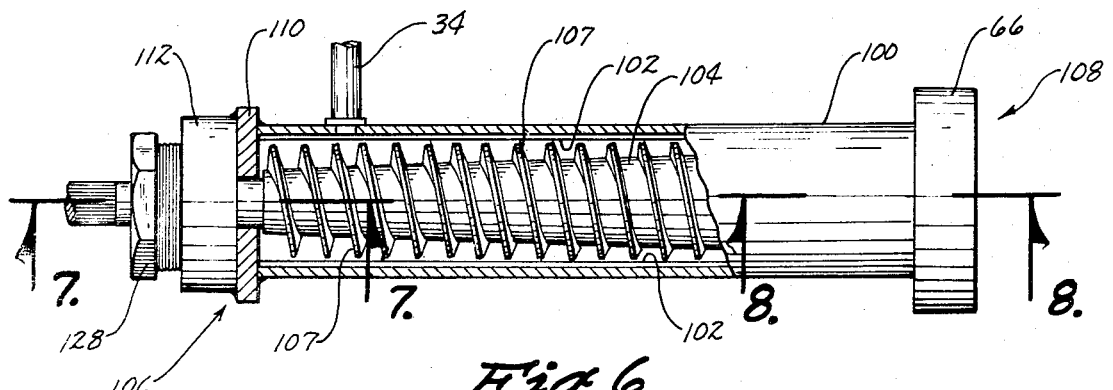
FIG. 6 is a longitudinal sectional view of an alternate form of screw conveyer.

The machine of this invention is generally designated by the reference numeral 10 and comprises generally a main screw conveyer housing 12 having an intake end 14 and a discharge end 16. A driven shaft 18 rotatably extends inwardly through the end plate assembly 20 including sealing means and bearing means which are not shown. The shaft 18 may be driven by any conventional source of power such as a tractor power-take-off assembly. Shaft 18 has a cylinder portion 22 in housing 12 which has a spiral rib means or flighting 24 extending therefrom adapted to convey the material along the length of the housing 12.

As seen in FIGS. 1 and 2, the interior wall surface 26 of housing 12 has a spiral flighting 28 extending inwardly therefrom towards cylinder portion 22. If desired, flighting 28 may be comprised of straight ribs or flighting extending from one end of the housing to the other.

Housing 12 is provided with a material intake opening 30 formed therein adjacent intake end 14 which is in communication with a feed auger assembly generally designated by the reference numeral 32. Assembly 32 includes a tube 34 having a conveyer auger 36 rotatably mounted therein and driven by motor 38. Hopper 40 is mounted on the outer upper end of the tube 34 as illustrated in FIGS. 1 and 3.

The numeral 42 refers to an end portion or plate which is detachably mounted at the discharge end 16 of the housing 12 by a plurality of bolts 44 and brackets 46 as seen in FIGS. 1 and 2. End plate 42 has a central discharge opening 48 formed therein which rotatably receives the end portion 50 of shaft 18 extending therethrough. As seen in FIG. 2, the diameter of opening 48 is greater than the diameter of end portion 50 so as to permit material to be discharged from the housing around the end portion 50.

A flat washer 52 is mounted on an projects from the shaft 18 outwardly of end plate 42 and is maintained thereon by a retainer or nut 54. The diameter of washer 52 is substantially greater than opening 48 and is substantially equal to the diameter of housing 12. End plate 42 has ring-like collar 56 secured to the inner surface thereof by welding or the like which is partially received by an annular groove 58 formed in interior wall surface 26 adjacent discharge end portion 16.

The numeral 60 refers to a tapered wedge having a general ring-like configuration which is secured to the end of cylinder portion 22 by any conventional method such as welding or the like. For purposes of description, wedge 60 will be described as having end portions 62 and 64. As seen in FIG. 4, wedge 60 has a progressively increasing width along its length from end portion 62 to end portion 64. As seen in FIG. 5, wedge 60 has a progressively decreasing thickness from end portion 62 to end portion 64. The relationship of the tapered wedge 60 with respective to the cylinder portion 22 and the collar 56 is best illustrated in FIG. 2. Thus, wedge 60 has its smallest width but largest thickness at the end of cylinder portion 22 which is adjacent the collar 56.

In operation, rotational power is supplied to shaft 18 and the soy bean material or the like is deposited in hopper means 40 so that the auger means 36 will force the material into the interior of housing 12. The rotating cylinder portion 22 and the rib 24 provided thereon convey the material from one end of the housing 12 to the other. The flighting 28 is provided to prevent the soy bean material from simply turning with the cylinder portion 22 rather than moving to the discharge end of the machine. When the material reaches the discharge end of the cylinder portion 22, it is forced outwardly by the wedge means 60 towards the collar means 58 and towards the end plate 42. This action causes a tremendous pressure to be exerted on the material to the point where the soy beans are substantially liquified by the combination of heat and pressure generated by the intense frictional forces applied thereto at that particular point. The soy bean materials which are being processed are in a fluid state upon reaching the end of the flighting 24 and the wedge means 60. At this time, the soy beans are in small particles if not completely in a liquified form. The material is then passed between the end portion of the cylinder 22 and the inside surface of the end plate 42 and outwardly through the opening 48 around end portion 50 of shaft 18. The material is then forced outwardly between the outside metering surface of the end plate 42 and the inside meeting surface of the washer 52. Since the material is discharged 360° around the screw shaft 18, a suitable shield 66 is placed over the end of the apparatus to prevent the material from being discharged in all directions with considerable force.

The end plate 42 becomes extremely hot during the processing operation due to heat being conducted thereto by the housing 12. The washer 52 also becomes extremely warm during the processing operation due to the heat being conducted thereto by the shaft 18. Thus, upon the material being forced against the hot end plate 42 and also the hot washer 52, the cooking operation is enhanced. The intense heat and pressure applied to the soy bean material as it passes through the housing 12 and outwardly therethrough in effect cooks the soy bean material to neutralize the urease activity therein. It can be appreciated that the interior of housing 12 is easily cleaned by simply removing nut 54 and by also removing the nut from the bolt 44 to expose the discharge end of the housing 12.

Vertical hollow stack 12A is in communication with the interior of housing 12. In the event that the pressure and input flow of material into the unit becomes excessive and cannot be immediately relieved by the flow of material out of the unit as described, a back pressure or reverse flow of the material in the unit is experienced. Under such conditions, the material "expands" into stack 12A rather than conduit 34, and the material will move downward by gravity back into housing 12 as soon as the pressure is relieved.

Figure 7:
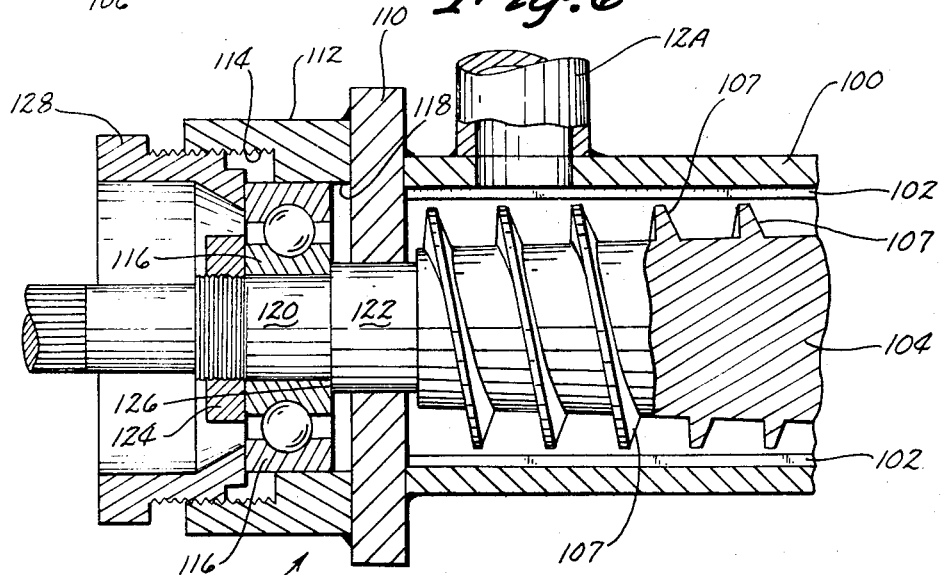
FIG. 7 is an enlarged sectional view of the power input end of the conveyer of FIG. 6 taken on line 7—7 thereof.
Figure 8:
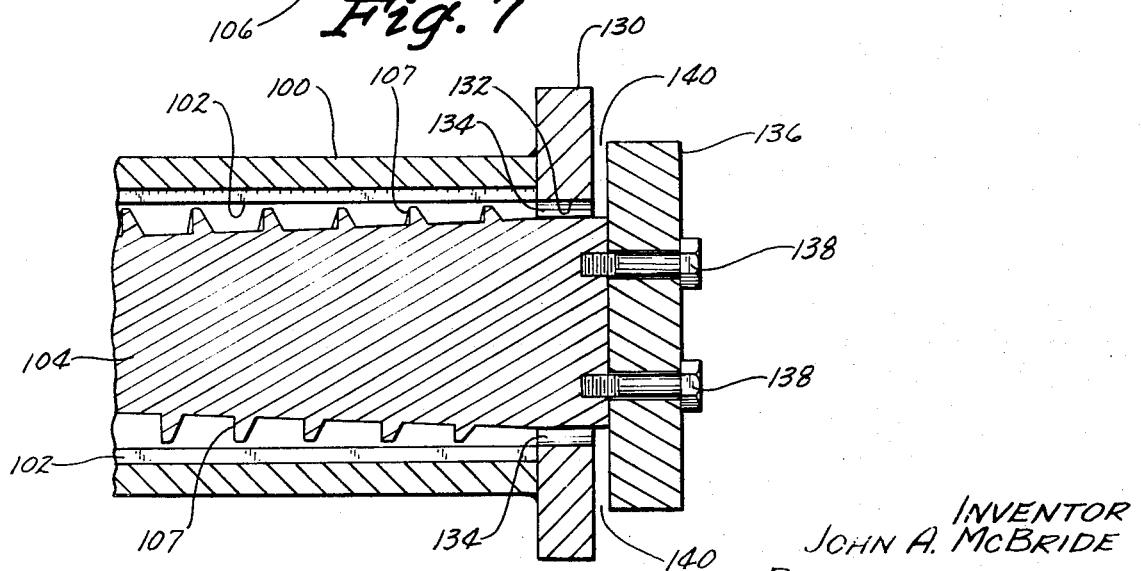
FIG. 8 is an enlarged sectional view of the discharge end of the conveyer of FIG. 6 taken on line 8—8 thereof.

An alternate form of the invention is shown in FIGS. 6–8. Cylindrical tubular housing 100 has elongated fluting members 102 in spaced relation on its interior diameter. Intake conduit 34 and stack 12A are connected thereto in the same manner as they were connected to housing 12. Tapered shaft 104 has its smaller end adjacent power input end 106 of housing 100, and the larger end or increased diameter portion of shaft 104 extends through the open discharge end of housing 100. Threads 107 which progressively decrease in height extend from the small end to the larger end of shaft 100.

End plate 110 is welded to end 106 of housing 100, and collar 112 is welded to plate 110. Collar 112 has an internally threaded portion 114. Bearing 116 is slidably mounted within shoulder 118 of collar 112, and bearing 116 rotatably receives the portion 120 of shaft 104. Portion 120 has a diameter less than adjacent portion 122 which rotatably extends through plate 110. Nut 124 on shaft 104 holds bearing 116 against shoulder 126. Hollow nut 128 is threadably received in threaded portion 114 of collar 112, and rotation of nut 128 has the effect of either moving the shaft inwardly or outwardly of housing 100 for a purpose to be described hereafter.

A plate or end portion 130 is welded on the discharge end of housing 100, and the enlarged end of shaft 104 protrudes through discharge opening 132. The metering space 134 between the opening 132 and shaft 104 defines the initial discharge path of the cooked material. A plate or washer 136 is secured to the end of shaft 104 by bolts 138. The metering space 140 between plates 130 and 136 defines the final discharge path of the cooked material.

The adjustment of nut 128 in the manner described permits the adjustment of the space 140, so that the discharge of the material, and the extent to which the material is cooked, can be adjusted and controlled. Shaft 104 can be easily removed from the housing 100 by removing nut 124 from shaft 104, and then withdrawing the shaft from end 108 of the housing.

Shield 66 can also be attached to the discharge end 108 of housing 100. The general operation of the devices in FIGS. 1–5 and 6–8 is the same.

Thus, it is seen that this invention accomplishes its stated objectives.

I claim:

1. A machine for cooking material, comprising,
an elongated hollow housing having opposite ends and an interior wall surface,
a screw conveyer means including a shaft with flighting thereon rotatably mounted in said housing, said screw conveyer means including a spiral flighting means for conveying material along the interior of said housing upon the rotation of said shaft,
said housing having a material inlet opening adjacent its said one end,
means for supplying material to said material inlet opening,
said housing having fluting means provided on its interior wall surface,
an end plate closing the other end of said housing, said end plate having a discharge opening formed therein which rotatably receives one end of said drive shaft extending therethrough, said discharge opening having a larger diameter than said shaft to permit material to be discharged from said housing outwardly therethrough around said shaft,
a washer means on said shaft outwardly of said end plate and having a diameter substantially greater than the diameter of said discharge opening,
and means maintaining said washer means on said shaft,
said material being heated and cooked by heat and pressure applied thereto which is generated as the material is conveyed along the interior of said housing, forced against said end plate, discharged outwardly through said discharge opening, and passed between said end plate and said washer means,
means on said shaft and said housing for selectively adjusting the longitudinal position of said shaft to adjust to space between said end plate and said washer means.

2. A machine for cooking material, comprising,
an elongated hollow housing having opposite ends and an interior wall surface,
a screw conveyer means including a shaft with flighting thereon rotatably mounted in said housing, said screw conveyor means including a spiral flighting means for conveying material along the interior of said housing upon the rotation of said shaft, said housing having a material inlet opening adjacent its said one end, means for supplying material to said material inlet opening, said housing having fluting means provided on its interior wall surface, an end plate closing the other end of said housing, said end plate having a discharge opening formed therein which rotatably receives one end of said drive shaft extending therethrough, said discharge opening having a larger diameter than said shaft to permit material to be discharged from said housing outwardly therethrough around said shaft, a washer means on said shaft outwardly of said end plate and having a diameter substantially greater than the diameter of said discharge opening, and means maintaining said washer means on said shaft, said material being heated and cooked by heat and pressure applied thereto which is generated as the material is conveyed along the interior of said housing, forced against said end plate, discharged outwardly through said discharge opening, and passed between said end plate and said washer means, said shaft having a progressively increased diameter as it extends from the material inlet opening to the other end of said housing, said shaft being rotatably connected to said housing by a bearing assembly including a bearing element and a lock nut on said shaft, whereby removal of said lock nut will permit said shaft to be withdrawn through said bearing element and through the end of said housing opposite to said material input end.

3. A machine for cooking material, comprising an elongated hollow housing having opposite ends and an interior wall surface, a screw conveyer means including a shaft with flighting thereon rotatably mounted in said housing, said screw conveyer means including a spiral slighting means for conveying material along the interior of said housing upon the rotation of said shaft, said housing having a material inlet opening adjacent one end, means for supplying material to said material inlet opening, said housing having fluting means provided on its interior wall surface extending inwardly therefrom and terminating at a point spaced radially outwardly of the outer periphery of said flighting thereby creating restricted clearance between said flighting means and said fluting means, an end plate at the other end of said housing, said end plate having a discharge opening formed thereon adjacent one end of said shaft, said discharge opening having a larger diameter than said shaft to permit material to be discharged from said housing outwardly therethrough around said shaft, a washer means outwardly of said end plate with restricted clearance between said end plate and said washer means and having a diameter substantially greater than the diameter of said discharge opening, the restricted clearances being such that material is heated and cooked by heat and pressure generated as the material is conveyed along the interior of said housing, forced against said end plate, discharged outwardly through said discharge opening, and passed between said end plate and said washer means, and a tapered wedge means mounted on said screw conveyer means adjacent the inner surface of said end plate, said wedge means conveyer around said conveyer means and having a progressively increasing thickness to progressively compress the material between it and the interior wall surface of said housing as said conveyer means is rotated.

4. The machine of claim 3 wherein said wedge means is ring-shaped and also has a progressively decreasing width so as to provide a wedge means which progresses from a relatively narrow and thick end portion to a relatively wide and thin end portion.

5. The machine of claim 2 wherein said screw conveyer means includes a cylindrical portion having the said spiral flighting means protruding therefrom, said wedge means being secured to said cylindrical portion and having a maximum thickness substantially equal to the distance said spiral flighting means protrudes from said cylindrical portion.

6. A machine for cooking grain, comprising an elongated hollow housing assembly having a longitudinal axis, opposite ends and an interior wall surface, a screw conveyer means including a shaft assembly extending longitudinally of, and rotatably mounted in said housing assembly, said screw conveyer means including a spiral flighting means for conveying grain along the interior of said housing assembly upon the rotation of said shaft assembly with restricted clearance between said flighting means and said surface, said housing assembly having grain inlet and discharge openings adjacent its opposite ends, means for supplying grain to said grain inlet opening, cooking control means comprising adjustable blocking means for adjustably restricting and adjustably partially blocking said discharge opening, said adjustable blocking means including a first metering surface on said shaft assembly, said first metering surface cooperating with a second metering surface on said housing assembly and defining therewith said discharge opening, the restrictive action provided by the restricted clearance and blocking means being such that grain is heated and cooked by heat and pressure generated as the grain is conveyed along the interior of said housing assembly, discharged outwardly through said discharge opening and past said blocking means, and said cooking control means operable to selectively adjust the restrictive action provided by said restricted clearance and said blocking means and cause selective regulation of said heating and cooking of said grain.

7. A machine according to claim 6, wherein said adjustable blocking means includes a projecting portion projecting from said shaft assembly adjacent said discharge opening, said projecting portion bearing said first metering surface and being adjustably mounted on said shaft assembly for adjustment relative thereto, and retainer means adjustable retaining said projecting portion on said shaft assembly, said housing assembly including an end portion about said discharge opening, said end portion bearing said second metering surface.

8. A machine according to claim 6 wherein said adjustable blocking means includes an increased diameter portion of said shaft assembly fixedly projecting from said shaft assembly adjacent said discharge opening.

9. A machine according to claim 8 wherein said shaft assembly is axially movable relative to said housing assembly to adjust said adjustable blocking means, said increased diameter portion bearing said first metering surface, said housing assembly including an end portion about said discharge opening, said end portion bearing said second metering surface.

* * * * *